(12) United States Patent
Yokokawa et al.

(10) Patent No.: US 11,209,604 B2
(45) Date of Patent: Dec. 28, 2021

(54) CONNECTING HARNESS

(71) Applicant: SUMITOMO ELECTRIC INDUSTRIES, LTD., Osaka (JP)

(72) Inventors: Tomoyuki Yokokawa, Osaka (JP); Keiju Okabe, Osaka (JP); Tomikazu Ichinose, Tokyo (JP); Tsutomu Yamazaki, Tokyo (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/821,059

(22) Filed: Mar. 17, 2020

(65) Prior Publication Data

US 2020/0341220 A1    Oct. 29, 2020

(30) Foreign Application Priority Data

Mar. 20, 2019 (JP) .............................. JP2019-053192

(51) Int. Cl.
*G02B 6/44* (2006.01)
*G02B 6/38* (2006.01)
*H02G 3/04* (2006.01)

(52) U.S. Cl.
CPC ......... *G02B 6/4472* (2013.01); *G02B 6/3873* (2013.01); *G02B 6/443* (2013.01); *H02G 3/0462* (2013.01)

(58) Field of Classification Search
None
See application file for complete search history.

(56) References Cited

U.S. PATENT DOCUMENTS 6,381,397 B1 *   4/2002   Bevan .................. G02B 6/4446
                                              385/139
10,678,012 B1 *  6/2020   Wu ........................ G02B 6/447
(Continued)

FOREIGN PATENT DOCUMENTS

| JP | 2000-241629 A | 9/2000 |
| JP | 2001-4849 A | 1/2001 |
| JP | 2001-311836 A | 11/2001 |

*Primary Examiner* — Jerry Rahll
(74) *Attorney, Agent, or Firm* — Faegre Drinker Biddle & Reath LLP

(57) ABSTRACT

Disclosed is a connecting harness that connects M first devices (where M is an integer equal to or greater than 1) and N second devices (where N is an integer equal to or greater than 2) using connecting cords each including at least one of an optical fiber cord and a metal cord. The connecting harness includes a connecting cord group including the M×N connecting cords, in which first connectors capable of being connected to the first devices are provided at one end of each of the connecting cords and second connectors capable of being connected to the second devices are provided at the other end of each of the connecting cords; a first bundling member bundling the connecting cords of the connecting cord group beside the first device in a predetermined number; and a second bundling member bundling the connecting cords of the connecting cord group beside the second device in a predetermined number. The connecting cord group is made into a harness in advance such that the connecting cords correspond to connection ports of the first devices and connection ports of the second devices using the first bundling member and the second bundling member.

23 Claims, 10 Drawing Sheets

(56) References Cited

U.S. PATENT DOCUMENTS

| | | | |
|---|---|---|---|
| 2002/0111048 A1* | 8/2002 | Kondoh | B60R 16/0207 439/34 |
| 2003/0016925 A1* | 1/2003 | Sun | G02B 6/3612 385/115 |
| 2005/0029004 A1* | 2/2005 | Robinson | G02B 6/4471 174/72 A |
| 2007/0053646 A1* | 3/2007 | Kendricks | H02G 3/0481 385/136 |
| 2009/0273915 A1* | 11/2009 | Dean, Jr. | G02B 6/4459 361/826 |
| 2010/0303431 A1* | 12/2010 | Cox | G02B 6/4472 385/135 |
| 2013/0163932 A1* | 6/2013 | Cooke | G02B 6/4472 385/76 |
| 2014/0102747 A1* | 4/2014 | Mizuhira | B60R 16/0215 174/68.3 |
| 2014/0131094 A1* | 5/2014 | Hamamoto | B60R 16/0215 174/72 A |
| 2014/0259650 A1* | 9/2014 | Carter | G09B 23/182 29/825 |
| 2015/0016788 A1* | 1/2015 | Buff | G02B 6/4475 385/100 |
| 2016/0306129 A1* | 10/2016 | Hurley | G02B 6/4433 |
| 2016/0306130 A1* | 10/2016 | Bringuier | G02B 6/4433 |

\* cited by examiner

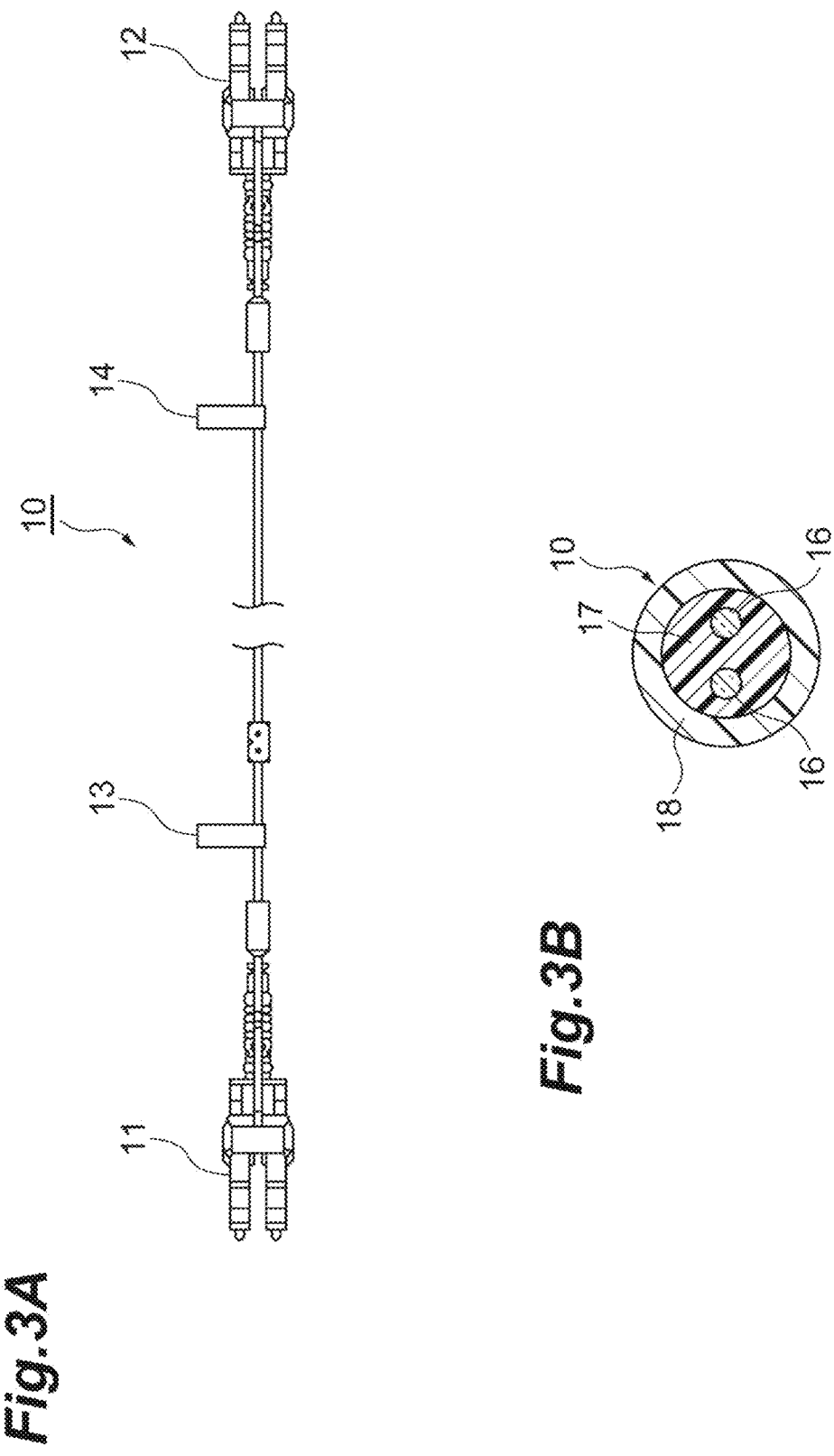

CONNECTING HARNESS

CROSS-REFERENCE TO RELATED APPLICATIONS

The present application is based upon and claims the benefit of the priority from Japanese Patent Application No. 2019-053192, filed on Mar. 20, 2019, the entire contents of which are incorporated herein by reference.

TECHNICAL FIELD

The present disclosure relates to a connecting harness for connecting first device or devices and second devices using connecting cords.

BACKGROUND

JP2000-241629A, JP2001-004849A, and JP2001-311836A disclose an optical wiring board in which various types of optical units are connected by optical connection members such as optical fibers.

SUMMARY

The present disclosure provides a connecting harness for connecting M first device or devices (where M is an integer equal to or greater than 1) and N second devices (where N is an integer equal to or greater than 2) using connecting cords each including at least one of an optical fiber cord and a metal cord. The connecting harness includes: a connecting cord group including the M×N connecting cords, in which first connectors capable of being connected to the first device or devices are provided at one end of each of the connecting cords and second connectors capable of being connected to the second devices are provided at the other end of each of the connecting cords; a first bundling member bundling the connecting cords of the connecting cord group beside the first device or devices in a predetermined number; and a second bundling member bundling the connecting cords of the connecting cord group beside the second devices in a predetermined number. The connecting cord group is made into a harness in advance such that the connecting cords correspond to connection ports of the first device or devices and connection ports of the second devices using the first bundling member and the second bundling member.

BRIEF DESCRIPTION OF THE DRAWINGS

FIG. 3A is a plan view illustrating an example of an optical fiber cord;

FIG. 3B is a sectional view illustrating an example of a cross-section of the optical fiber cord;

DETAILED DESCRIPTION

Figure 1:
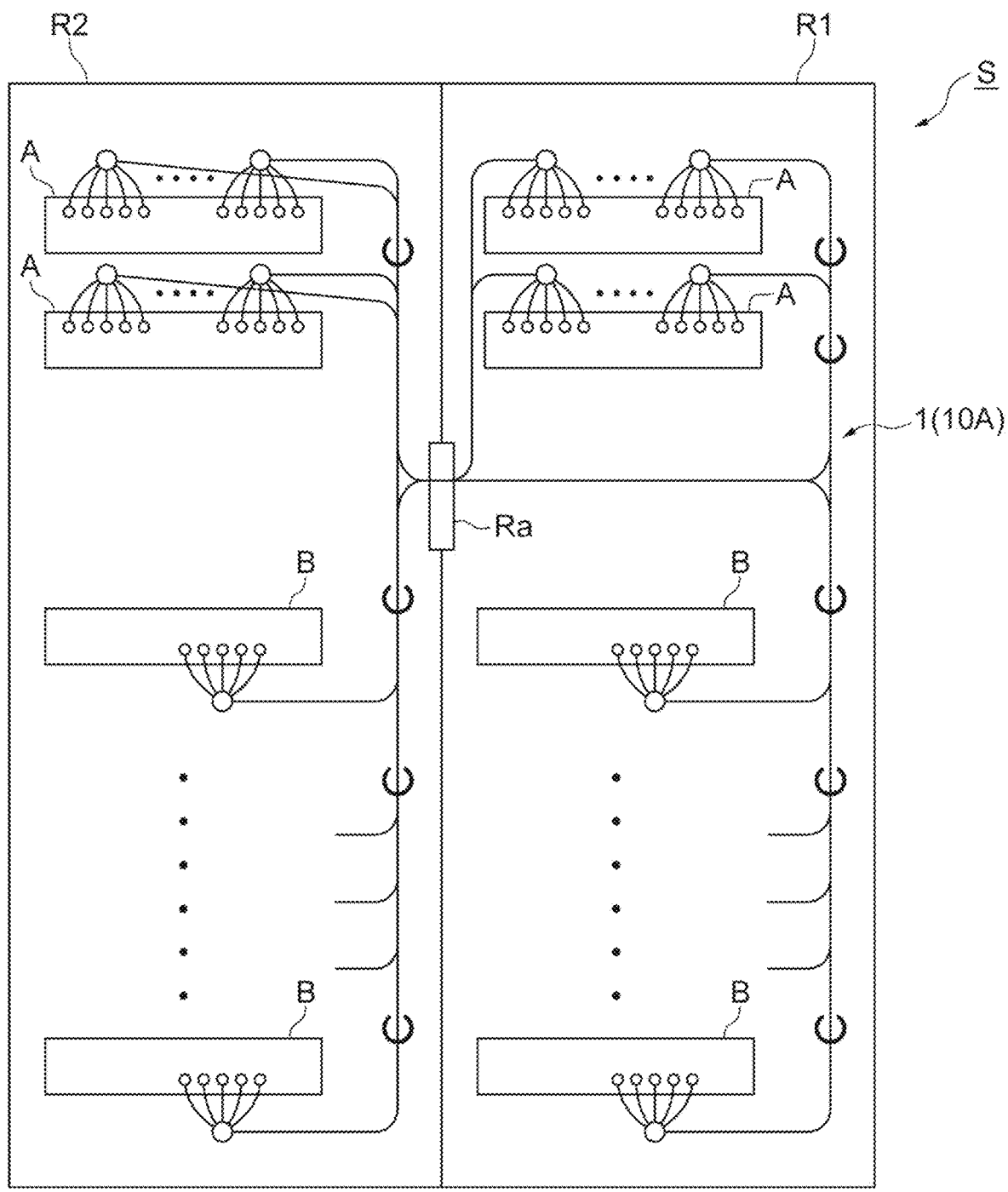
FIG. 1 is a diagram schematically illustrating an optical wiring board in which an optical/metallic composite harness according to an embodiment is used.

Problems to be Solved by the Present Disclosure

When an optical wiring board is assembled, connection members such as a plurality of optical fiber cords or metal cords (LAN cables) are individually connected to optical modules and wiring work with the optical wiring board is performed in a workplace. Since the number of optical modules which are connected or the number of connection ports in the optical modules is large, the connecting work is also massive and troublesome and much time is required for assembly of devices. Accordingly, there is demand for an increase in efficiency of assembly work of devices requiring wiring of the optical wiring board.

Advantageous Effects of the Present Disclosure

According to an aspect of the present disclosure, it is possible to enhance efficiency of wiring work in devices requiring wiring.

Description of Embodiments of the Present Disclosure

First, details of embodiments of the present disclosure will be described below. A connecting harness according to an embodiment of the present disclosure is a connecting harness that connects M first device or devices (where M is an integer equal to or greater than 1) and N second devices (where N is an integer equal to or greater than 2) using connecting cords each including at least one of an optical fiber cord and a metal cord. The connecting harness includes: a connecting cord group including the M×N connecting cords, in which first connectors capable of being connected to the first device or devices are provided at one end of each of the connecting cords and second connectors capable of being connected to the second devices are provided at the other end of each of the connecting cords; a first bundling member bundling the connecting cords of the connecting cord group beside the first device or devices in a predetermined number; and a second bundling member bundling the connecting cords of the connecting cord group beside the second devices in a predetermined number. The connecting cord group is made into a harness in advance such that the connecting cords correspond to connection ports of the first device or devices and connection ports of the second devices using the first bundling member and the second bundling member.

In the connecting harness, the connecting cord group is made into a harness in advance such that a plurality of connecting cords correspond to connection ports of the first device or devices and connection ports of the second devices using the first bundling member and the second bundling member. In this embodiment, since the first device or devices and the second devices are connected to each other using the connecting harness which is made into a harness in advance, it is possible to easily identify each connecting cord which is to be connected to a predetermined connection port in comparison with a case in which the devices are individually connected using individual optical fiber cords one by one in a workplace according to the related art. Accordingly, it is possible to enhance efficiency of wiring work with various types of devices in an optical wiring board. Not being limited to this, when wiring connection is performed using a plurality of connecting cords in which the number of connecting cords (M×N) used in the connecting harness is greater than 50 or 100, the connecting harness can more markedly enhance work efficiency.

In an embodiment, the number of connecting cords which are bundled by each first bundling member may be greater than the number of connecting cords which are bundled by each second bundling member. In this embodiment, even when the numbers of devices are different from each other such as a case in which the number of first device or devices is less than the number of second devices, it is possible to enhance efficiency of wiring work with various types of devices in an optical wiring board. The number of first devices may be equal to the number of second devices, or the number of second devices may be less than the number of first devices.

In an embodiment, the connecting harness may further include a third bundling member bundling the connecting cords in an intermediate area between the first bundling member and the second bundling member. The number of connecting cords which are bundled by the third bundling member may be greater than the numbers of connecting cords which are bundled by each first bundling member and each second bundling member. In this embodiment, even when the connecting cords such as optical fiber cords are long, it is possible to curb intertangling of the connecting cords in the course of wiring work by the third bundling member bundling the connecting cords in the middle thereof. As a result, it is possible to further enhance the efficiency of wiring work with various types of devices of an optical wiring board or the like.

In an embodiment, the first bundling member and the second bundling member may be net tubes or spiral tubes. According to this embodiment, it is possible to realize the first bundling member and the second bundling member using a means which is more simple and inexpensive. The third bundling member may be a net tube or a spiral tube.

In an embodiment, an extra-length portion by which the length of the connecting cords at the time of actual wiring is greater than a planned wiring distance between the first device or devices and the second devices is provided in advance in the connecting cord group. Since a connecting cord with connectors at both ends is generally produced in the unit of 0.5 m or 1 m and has a manufacturing dimensional tolerance, it is not easy to accurately match a wiring route length (a planned wiring distance) between the first device or devices and the second devices. In wiring work in a workplace in the related art, slightly longer connecting cords are selected and the length is adjusted in the middle of a wiring route. On the other hand, with the connecting harness according to this embodiment, it is possible to omit work of adjusting the length of the connecting cords in the workplace by providing the extra-length portion in advance. Accordingly, with the connecting harness according to this embodiment, it is possible to further enhance the efficiency of wiring work with various types of devices of an optical wiring board or the like.

In an embodiment, the connecting harness may further include an aligning member aligning the connectors at the time of connection to the corresponding first device or devices or second devices at at least one of the first connectors and the second connectors of the connecting cords. According to this embodiment, it is possible to perform connection of a plurality of connectors to the first device or devices or the second devices en bloc and to further enhance the efficiency of wiring work with various types of devices of an optical wiring board or the like.

In an embodiment, one of the connecting cords may include the optical fiber cord. The optical fiber cord may include a plurality of optical fibers, a tensile-strength fiber surrounding the plurality of optical fibers, and a jacket surrounding the tensile-strength fiber wherein a sectional shape of the jacket may be tubular. Accordingly, it is possible to provide a more compact harness.

Details of Embodiments of the Present Disclosure

A specific example of a connecting harness according to an embodiment of the present disclosure is described below with reference to the accompanying drawings. The present invention is not limited to the example, but is defined by the appended claims, and it is intended to include all modifications within meanings and scopes equivalent to the claims. In the following description, the same elements in description with reference to the drawings will be referred to by the same reference signs and description thereof will not be repeated.

An optical wiring board using an optical/metallic composite harness (a connecting harness) according to an embodiment is described below with reference to FIG. 1. FIG. 1 is a diagram schematically illustrating an optical wiring board. As illustrated in FIG. 1, an optical wiring board S (a connecting structure) includes racks R1 and R2, M switching devices A (first device or devices) which are disposed in the racks R1 and R2, N servers B (second devices) which are disposed in the racks R1 and R2, and an optical/metallic composite harness 1 for connecting the switching devices A and the servers B. The optical/metallic composite harness 1 includes a connecting cord group 10A including a plurality of optical fiber cords and a plurality of metal cords. Here, "M" is an integer which is equal to or greater than 1 and "N" is an integer which is equal to or greater than 2. "M" and "N" may be the same integer or may be different integers. For example, "M" may be less than "N," or "M" may be greater than "N" depending on a device configuration to be connected.

The racks R1 and R2 are, for example, 19-inch racks and accommodate various types of devices such as the switching devices A and the servers B therein. An opening Ra through which the connecting cords 10 such as optical fiber cords are wired between the racks R1 and R2 is provided therebetween. Each switching device A is an optical switch such as an optical circuit switching device or a LAN switch and switches an optical path in an optical network. A plurality of connection ports (for example, a multiple of 5 in the example illustrated in the drawing) that can be connected to connectors provided at one ends of the optical/metallic composite harness 1 are provided in front of (a nearside in the drawing) of the switching devices A. For example, the servers B are sequentially installed at intervals in a vertical direction of the racks R1 and R2. A plurality of connection ports (for example, 5 in the example illustrated in the drawing) that can be connected to connectors provided at the other ends of the optical/metallic composite harness 1 are provided in front of (the nearside in the drawing) of the servers B. In an example, four switching devices A and twenty servers B are connected by the optical/metallic composite harness 1 (a connecting cord group 10A). When an optical switch which is a switching device A and a server B are connected, an optical fiber cord is used as a connecting cord. When a LAN switch which is a switching device A and a server B are connected, a metal cord is used as a connecting cord.

Figure 2:
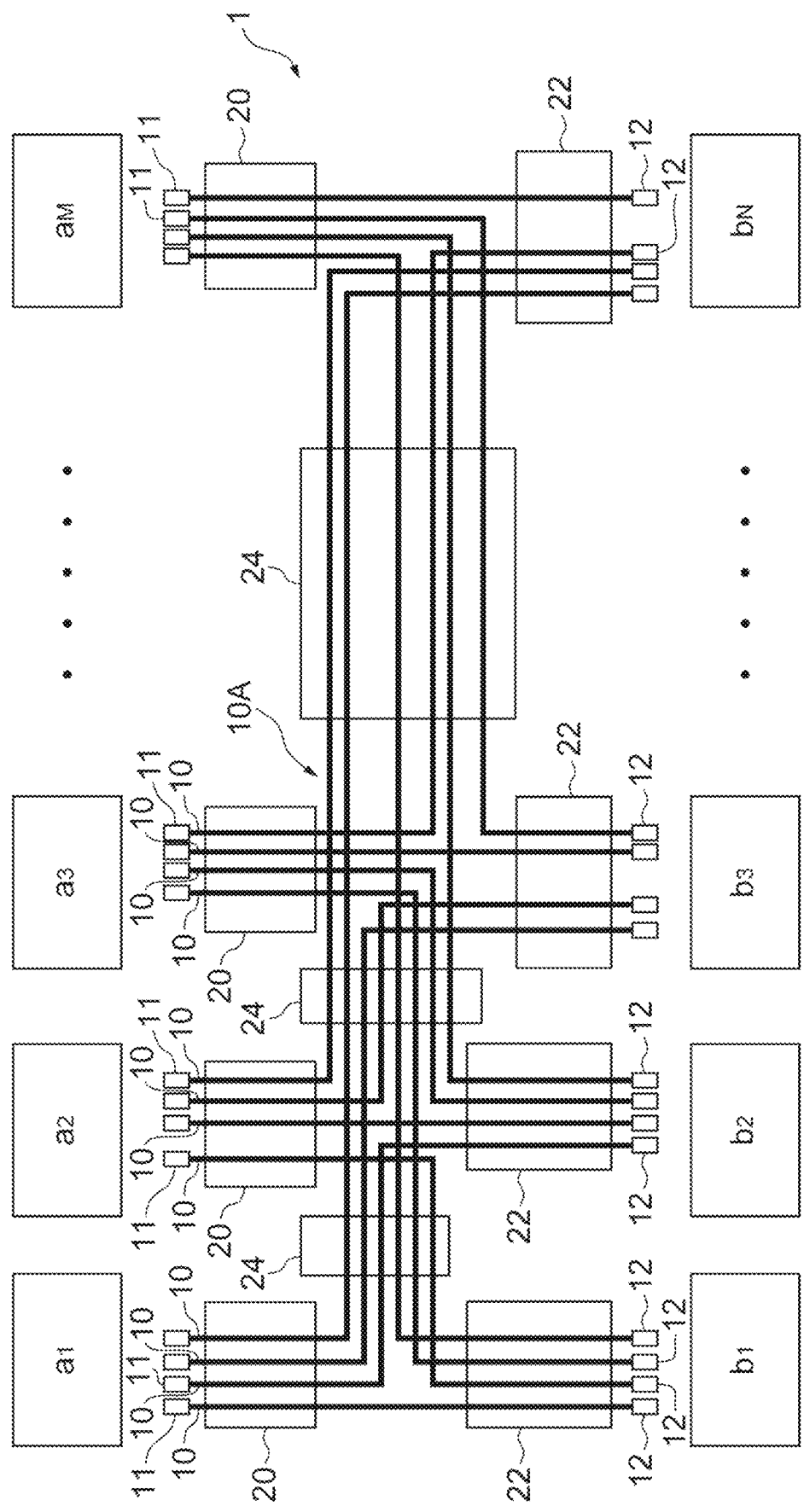
FIG. 2 is a diagram illustrating a connecting mode using the optical/metallic composite harness according to the embodiment.
Figure 4A:
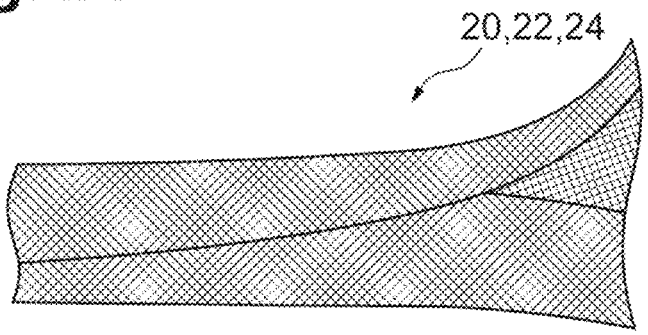
FIG. 4A is a diagram illustrating an appearance of an example of a net tube.
Figure 4B:
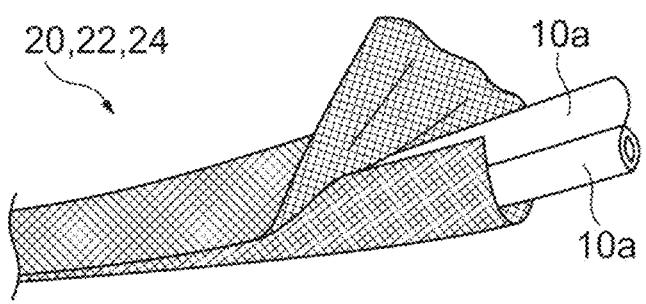
FIG. 4B is a diagram illustrating an example of a state in which cables are bundled by the net tube.
Figure 4C:
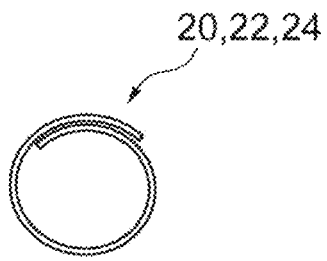
FIG. 4C is a sectional view illustrating a cross-section of the net tube.
Figure 4D:
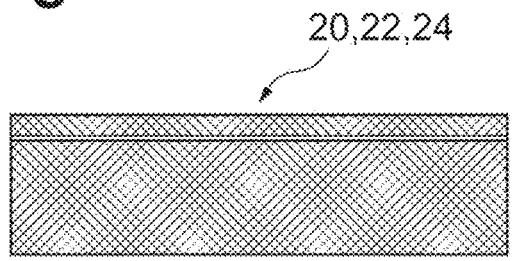
FIG. 4D is a side view illustrating the net tube.

FIG. 2 is a diagram schematically illustrating a connecting mode using the optical/metallic composite harness. As illustrated in FIG. 2, the optical/metallic composite harness 1 connects M switching devices A ($a_1, a_2, a_3, \ldots, a_M$) and N servers B ($b_1, b_2, b_3, \ldots, b_N$) using a plurality of (M×N) connecting cords 10 (a connecting cord group 10A). In the example illustrated in FIG. 2, a plurality of connecting cords 10 which are connected to the switching device $a_1$ are respectively connected to the servers $b_1, b_2, b_3, \ldots, b_N$, a plurality of connecting cords 10 which are connected to the switching device $a_2$ are respectively connected to the servers $b_1, b_2, b_3, \ldots, b_N$, a plurality of connecting cords 10 which are connected to the switching device $a_3$ are respectively connected to the servers $b_1, b_2, b_3, \ldots, b_N$, and a plurality of connecting cords 10 which are connected to the switching device $a_M$ are respectively connected to the servers $b_1, b_2, b_3, \ldots, b_N$. That is, the switching devices $a_1$ to $a_M$ are connected to the servers $b_1$ to $b_N$. Connectors 11 which can be directly connected to the opening of the switching devices A are provided at ends of the connecting cords 10 which are used for such connection beside the switching devices A and connectors 12 which can be directly connected to the opening of the servers B are provided at the other ends of the connecting cords 10 beside the servers B.

FIG. 3A is a plan view illustrating an example of an optical fiber cord which is a kind of connecting cord. FIG. 3B is a sectional view illustrating an example of a cross-section of the optical fiber cord. As illustrated in FIG. 3A, an optical fiber cord (a connecting cord 10) is a connecting cord including connectors 11 and 12 at both ends, and labels 13 and 14 are attached slightly inward from the both ends. The labels 13 and 14 indicate to which connection port of what switching device A or server B the connectors 11 and 12 are to be connected, and a predetermined letter or numeral or the like is printed thereon. The labels 13 and 14 may be color-coded such that one label is yellow and the other label is white depending on the devices (switching devices or servers) to which the connectors 11 and 12 are to be connected. An operator who connects the optical/metallic composite harness 1 to the switching devices A and the servers B can easily identify to which connection port of what device each optical fiber cord 10 is to be connected with reference to the labels 13 and 14. The optical fiber cord 10 has, for example, a length from 3 m to 5 m, and an optical fiber cord is selected from a range of 3 m to 5 m and used such that it is longer than a planned wiring distance between the devices which are connected to each other (so that a margin is provided).

As illustrated in the sectional view of FIG. 3B, a cord with a configuration in which two optical fibers 16 are surrounded by a tensile-strength fiber 17 and the resultant is surrounded by a jacket 18 can be used as the optical fiber cord. The outer diameter of the jacket 18 of the optical fiber cord preferably ranges from 1.5 mm to 2.0 mm. This is because an optical fiber cord with a smaller outer diameter can be more easily handled at the time of wiring work, and when the outer diameter is too small, the optical fiber cord is easily affected by the outside world and a possibility of communication characteristics of the optical fiber being affected becomes higher. For example, in this embodiment, the outer diameter of the jacket 18 of the optical fiber cord is 1.6 mm. When the outer diameter of the jacket 18 of the optical fiber cord is in the above range, the sectional area can be decreased at the time of being harness using the optical fiber cord, and then the optical fiber cord can comfortably pass through a narrow space and be wired. An optical fiber cord including a single optical fiber may be used as the connecting cord 10. The tensile-strength fiber 17 is, for example, an aramid fiber. The jacket 18 is formed of, for example, flame retardant polyethylene. The jacket 18 may be color-coded blue, light blue, and red for each device (for example, each switching device A) to which the optical fiber cord 10 of the optical/metallic composite harness 1 is connected, whereby the connection ports thereof can be more easily recognized.

When LAN switches are provided as the switching devices A, a metallic cord such as a LAN cable can also be used as the connecting cord 10. That is, the LAN switches and the servers are connected to each other by a metallic cord which is the connecting cord 10. The LAN cable may be, for example, an UTP cable. The LAN cable has a configuration in which a connector called a modular plug is provided at both ends thereof and four pairs of metal lines (total of eight) are incorporated therein. The same labels as the optical fiber cable may be provided on the LAN cable. Since the UTP cable is widely used, description thereof will be omitted.

Now, the optical/metallic composite harness 1 continue to be described with reference back to FIG. 2. The optical/metallic composite harness 1 includes a plurality of connecting cords 10 having the above configuration. In the optical/metallic composite harness 1, one ends of the connecting cords 10 are bundled in a predetermined number (for example, 10 or 40) by each first bundling member 20 beside the switching devices A, and the other ends of the connecting cords 10 are bundled in a predetermined number (for example, 5) by each second bundling member 22 beside the servers B. In the optical/metallic composite harness 1, a third bundling member 24 which bundles the connecting cords 10 in the middle area between the first bundling members 20 and the second bundling members 22 is provided. For example, a net tube or a spiral tube which is formed of a resin or the like can be used as the first bundling member 20, the second bundling member 22, and the third bundling member 24. As illustrated in FIGS. 4A to 4D, the net tube is, for example, a woven tube. With the first bundling members 20, the second bundling members 22, and the third bundling member 24 which are formed of the above tube, the connecting cords 10 can be accommodated in a part covered with the net tube while enlarging the part with a finger or the like. The inner diameter of the net tube used herein ranges, for example, from 6 mm to 25 mm, and the inner diameter may be greater or less than the range. It is preferable that the first bundling members 20 and the second bundling members 22 bundle the ends of the connecting cords 10 such that the connectors 11 and 12 or the labels 13 and 14 of the connecting cords 10 are not covered. Similarly, it is also preferable that the third bundling member 24 bundles the ends of the connecting cords 10 such that the connectors 11 and 12 or the labels 13 and 14 of the connecting cords 10 are not covered.

When the number of switching devices A is less than the number of servers B, the number of connecting cords 10 bundled by the first bundling member 20 is greater than the number of connecting cords 10 bundled by the second bundling member 22. Since the third bundling member 24 bundles the connecting cords 10 in the middle, the number of connecting cords 10 bundled by the third bundling member 24 is greater than the numbers of connecting cords 10 bundled by the first bundling member 20 and the second bundling member 22. However, the connecting cords 10 may be individually bundled in the middle area such that the number of connecting cords 10 bundled by the third bundling member 24 is equal to or less than the number of connecting cords 10 bundled by the first bundling member 20 or the second bundling member 22. In this way, in the optical/metallic composite harness 1, a plurality of connecting cords 10 are bundled in a predetermined number at both ends thereof or the like and are made into a harness. Accordingly, the connecting cords 10 correspond to the connecting ports of the switching devices A or the connection ports of the servers B.

Figure 5:
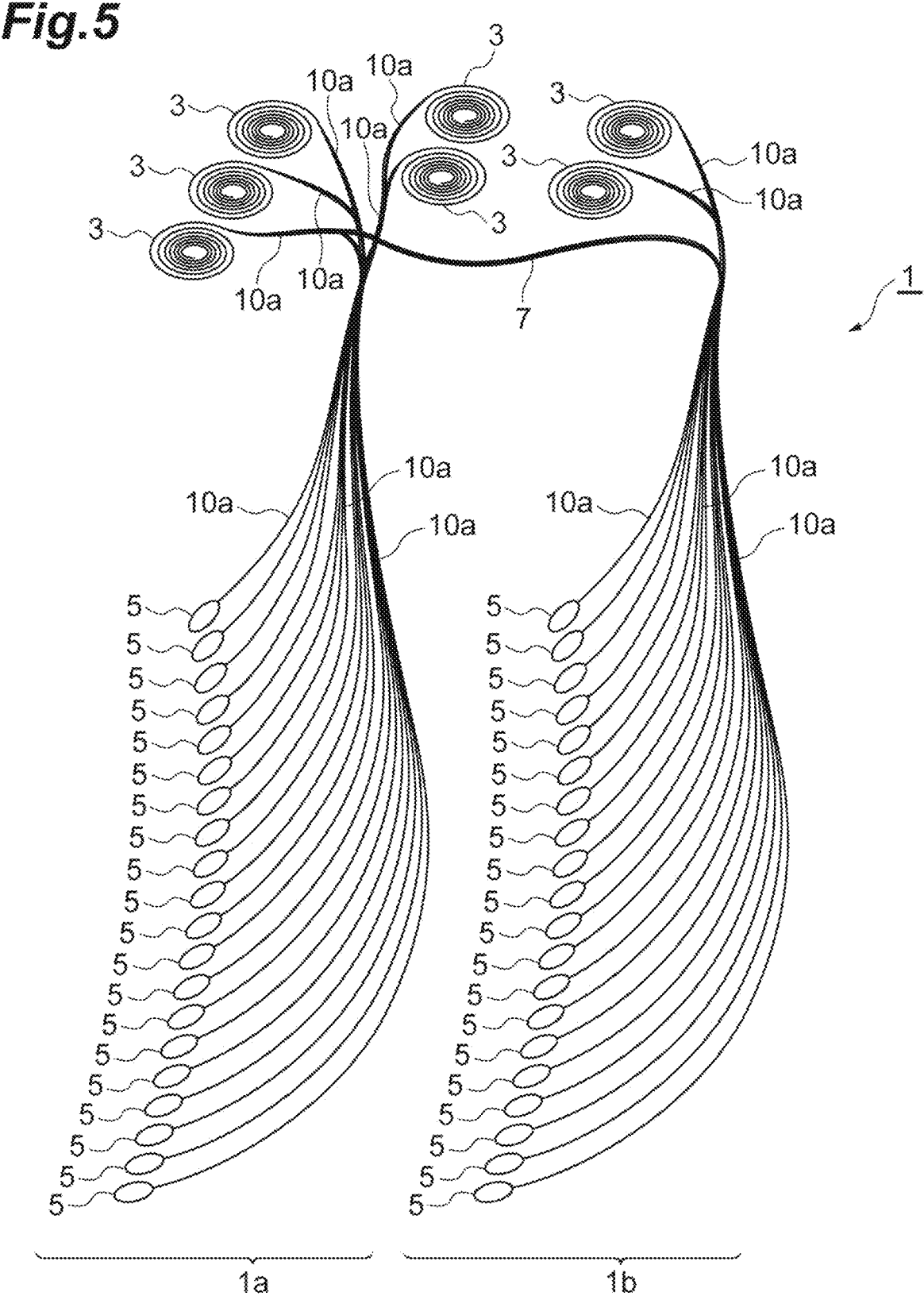
FIG. 5 is a diagram schematically illustrating an example of the optical/metallic composite harness.

An example of the configuration of the optical/metallic composite harness 1 is described below with reference to FIG. 5. FIG. 5 is a diagram schematically illustrating an example of the optical/metallic composite harness when one harness member is applied to two racks R1 and R2. As illustrated in FIG. 5, the optical/metallic composite harness 1 includes a plurality of connecting portions 3 corresponding to connection to the switching devices A and a plurality of connecting portions 5 corresponding to connection to the servers B. The connecting cords 10 between the connecting portions 3 and the connecting portions 5 are formed as a cable 10a in which a predetermined number of connecting cords are grouped by the third bundling member 24 or the like. In the connecting portions 3, for example, one ends of a plurality of (10 or 40) connecting cords 10 are bundled by the first bundling member 20, and the connectors 11 and the labels 13 at the ends are exposed to the outside from the first bundling member 20 (see FIG. 2).

On the other hand, in the connecting portions 5, for example, other ends of a plurality of (five) connecting cords 10 are bundled by the second bundling member 22, and the connectors 12 and the labels 14 at the ends are exposed to the outside from the second bundling member 22 (see FIG. 2). In the example illustrated in FIG. 5, since the number of connecting cords 10 bundled in the connecting portions 3 is greater than the number of connecting cords 10 bundled in the connecting portions 5, the number of connecting portions 3 is much less than the number of connecting portions 5. Since the optical/metallic composite harness 1 is a harness for connection between two racks R1 and R2, the optical/metallic composite harness 1 is partitioned into two parts 1a and 1b, which are connected by a straddle portion 7 therebetween. The straddle portion 7 is configured as a cable in which a predetermined number of connecting cords 10 are grouped and is disposed to pass through the opening Ra between the racks illustrated in FIG. 1.

Figure 6:
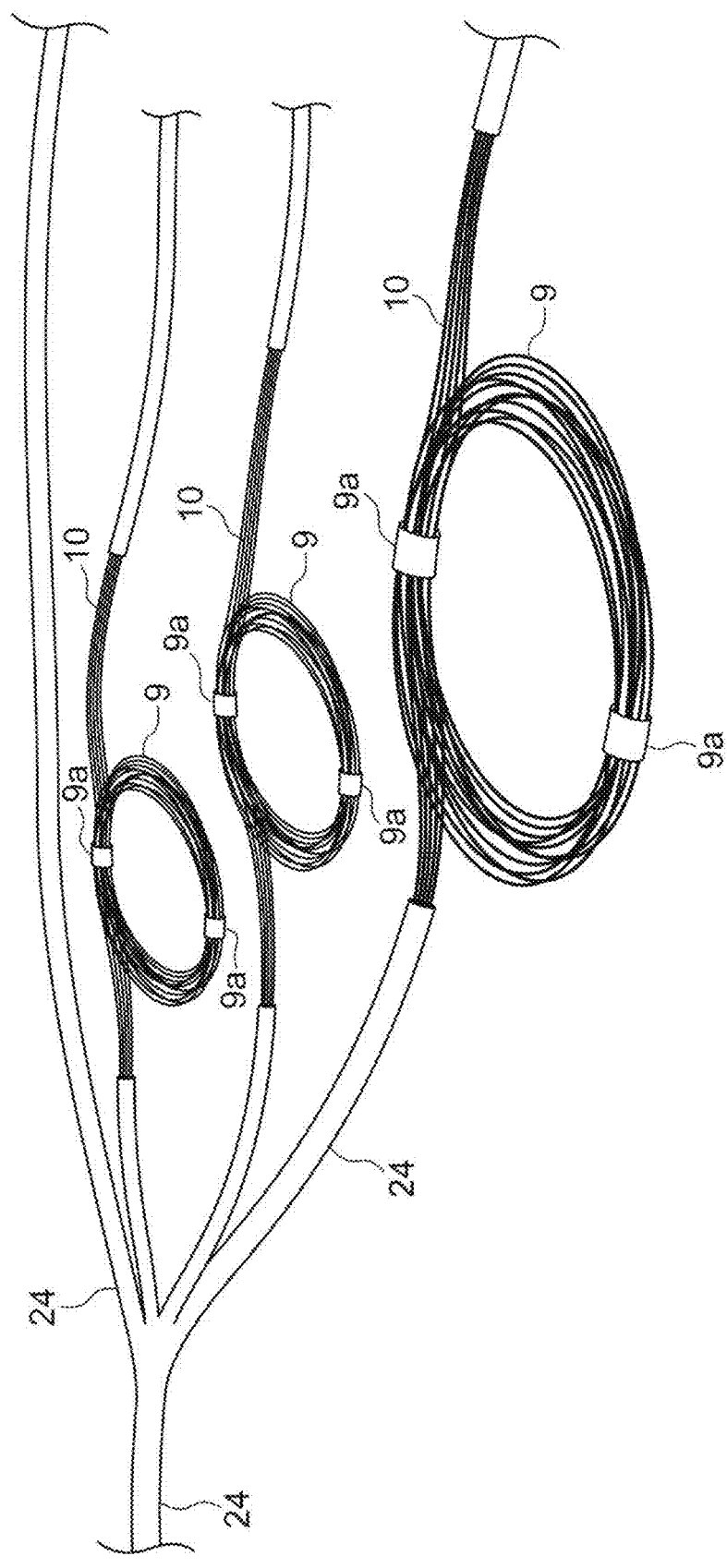
FIG. 6 is a plan view illustrating an example of an extra-length portion in the optical/metallic composite harness.

In each connecting portion 3, an extra-length portion in which a part corresponding to an extra length of the connecting cord 10 is rolled may be provided slightly inward from the connector 11 at the end. FIG. 6 is a diagram schematically illustrating an extra-length portion 9. Since a cord with connectors at both ends is generally produced in the unit of 0.5 m or 1 m and has a manufacturing dimensional tolerance, it is not easy to accurately match the wiring route length (the planned wiring distance) between the switching devices A and the servers B. In wiring work in a workplace in the related art, a somewhat long connecting cord is selected and the length in the middle of a wiring route is adjusted. On the other hand, in the optical/metallic composite harness 1, a part corresponding to such an extra length is provided as an extra-length portion 9 in advance. In the extra-length portion 9, the remaining connecting cord 10 is rolled and both ends thereof are fixed by a magic tape (registered trademark) 9a.

In the optical/metallic composite harness 1 according to this embodiment, a plurality of optical fiber cords 10 are made into a harness in advance by the first bundling members 20 and the second bundling members 22 to correspond to the connection ports of the switching devices A and the connection ports of the servers B. In this way, since the switching devices A and the servers B can be connected to each other using the optical/metallic composite harness 1 which is made into a harness in advance, it is possible to easily identify each connecting cord 10 which is to be connected to a predetermined connection port and to enhance the efficiency of wiring work in an optical wiring board in comparison with a case in which the devices are individually connected to each other using the connecting cords such as the optical fiber cords in a workplace. When wiring connection is performed using a plurality of connecting cords in which the number of connecting cords 10 which are used in the optical/metallic composite harness 1 is greater than 50 or 100, it is possible to further markedly enhance the work efficiency using the optical/metallic composite harness 1 having the above configuration.

The optical/metallic composite harness 1 further includes the third bundling member 24 which bundles a plurality of connecting cords 10 in the middle area between the first bundling members 20 and the second bundling members 22. Accordingly, even when the connecting cords 10 including an optical fiber cord are long, intertangling of the connecting cords 10 in the course of wiring work is curbed by the third bundling member 24 bundling the connecting cords in the middle. As a result, it is possible to further enhance the efficiency of wiring work with the devices of the optical wiring board.

In the optical/metallic composite harness 1, the first bundling member 20, the second bundling member 22, and the third bundling member 24 may be formed of net tubes or spiral tubes. Accordingly, it is possible to realize the bundling members using a means which is more simple and inexpensive.

In the optical/metallic composite harness 1, the extra-length portion 9 by which the length of the connecting cords 10 at the time of actual wiring is greater than the planned wiring distance between the switching devices A and the servers B is provided in advance in the connecting cord group 10A. Accordingly, it is possible to omit work for adjusting the length of the connecting cords 10 such as optical fiber cords in a workplace and to further enhance the efficiency of wiring work.

Figure 7:
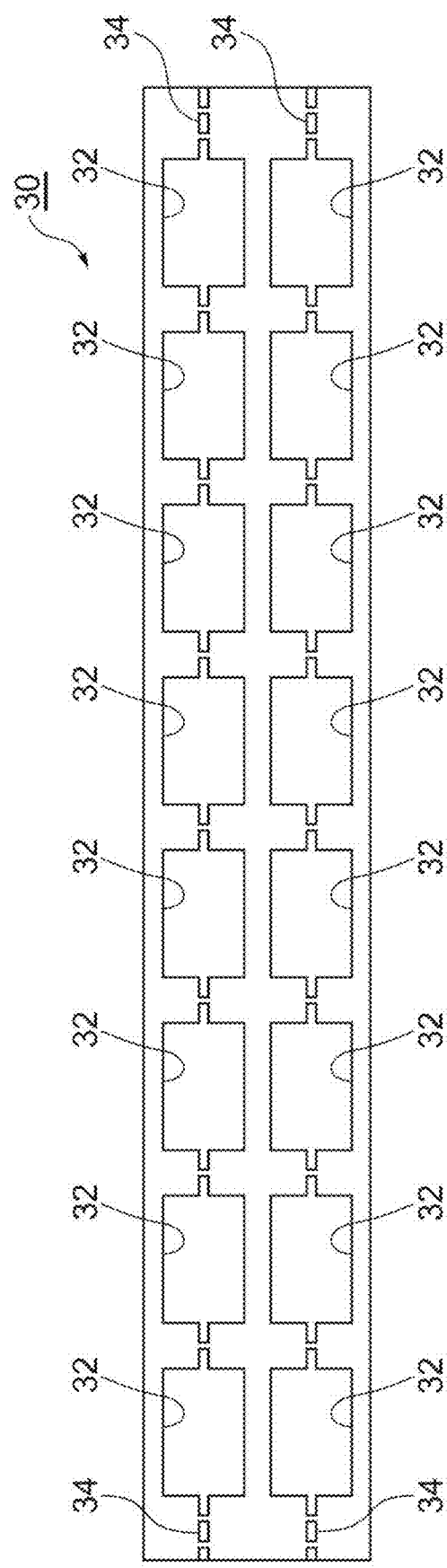
FIG. 7 is a diagram illustrating an example of an aligning member that aligns positions of connectors of optical fiber cords.

While an embodiment of the present disclosure has been described above in detail, the present disclosure is not limited to the embodiment and may be applied to various embodiments. For example, in the above embodiment, connecting cords such as the connecting cords 10 are bundled in a predetermined number by the first bundling members 20 and the second bundling members 22 to more easily identify devices which are to be connected, but the connecting cords 10 may be connected to the devices such as the switching devices A or the servers B en bloc using an aligning member 30 illustrated in FIG. 7. As illustrated in FIG. 7, the aligning member 30 is a plate-shaped resin-molded product in which a plurality of openings 32 with a size corresponding to the outer shape of the connectors 11 and 12 are provided. By setting the corresponding connectors 11 and 12 of the connecting cords 10 to correspond to the openings 32 in a one-to-one manner, the connectors at the time of connection to the switching devices A or the servers B can be aligned. A detachment line 34 may be provided in the aligning member 30 such that the aligning member 30 is detached after the connectors 11 and 12 aligned by the aligning member 30 have been connected to the switching devices A or the servers B.

Figure 8:
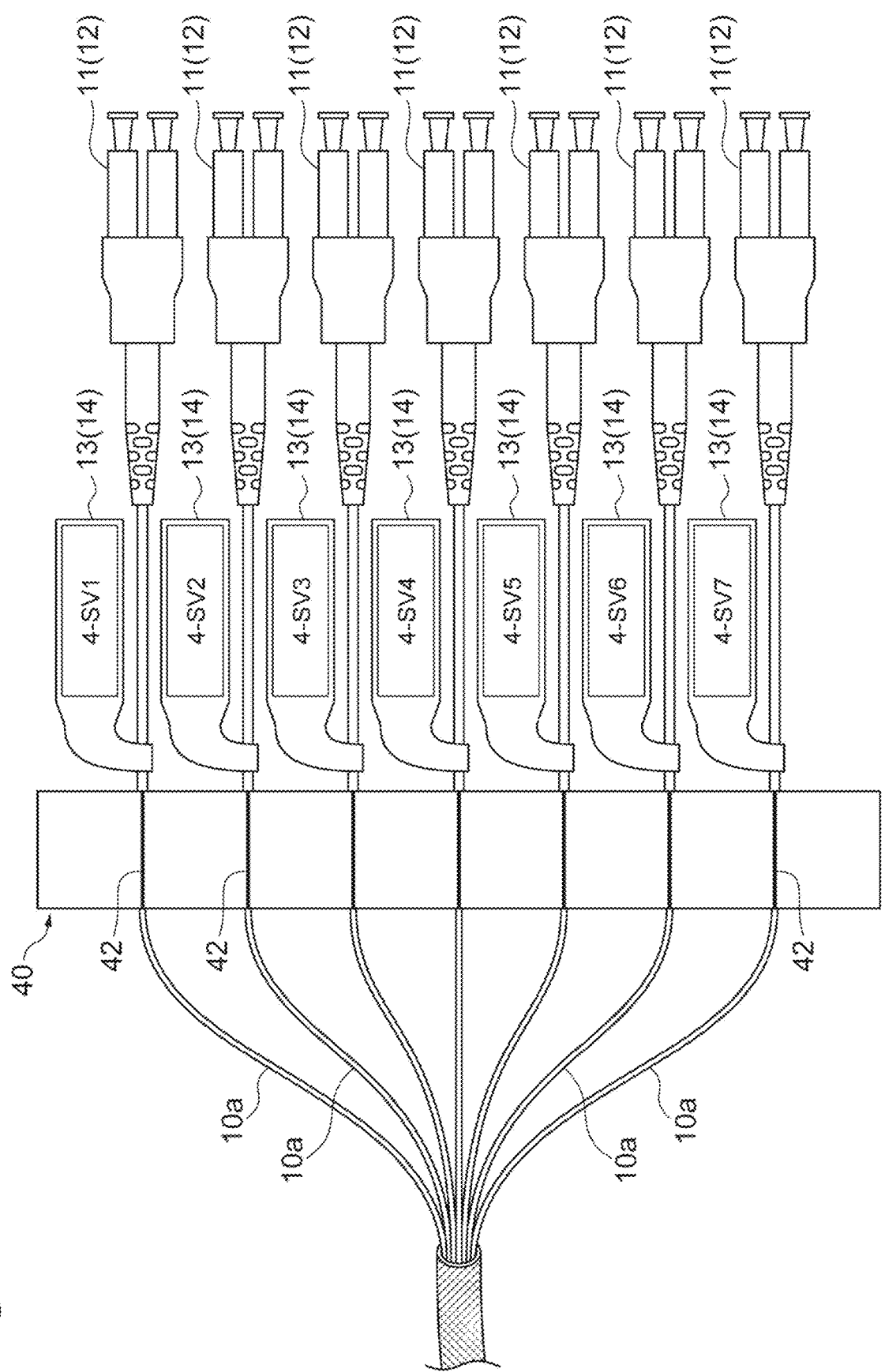
FIG. 8 is a diagram illustrating another example of the aligning member that aligns positions of connectors of optical fiber cords.

The connecting cords 10 may be connected to the switching devices A or the servers B en bloc using an aligning member 40 formed of sponge illustrated in FIG. 8 as another aligning member. As illustrated in FIG. 8, cuts 42 (seven cuts in the example illustrated in the drawing) corresponding to the number of connecting cords 10 are provided in the aligning member 40. Each cut 42 has a downward depth in the drawing and extends in the right-left direction. An end portion of each connecting cord 10 is inserted and locked in the corresponding cut 42, and the connecting cords 10 are preferably arranged in the order of numbers given to the connecting cords (the order of numbers described on the labels 13 or 14). In this way, by aligning portions close to the corresponding connectors 11 or 12 of the connecting cords 10 using the sponge aligning member 40 in advance, it is possible to more reliably align the connectors at the time of connection to the switching devices A or the servers B. Since the connecting cords 10 are accommodated in the cuts 42, the aligning member 40 can be easily detached after the connectors 11 or 12 aligned by the aligning member 40 have been connected to the switching devices A or the servers B. However, the aligning member 40 may not be detached. As an example of the outer shape of the sponge aligning member 40, a sponge piece with a length of 110 mm, a depth of 13 mm, and a height of 18 mm can be used, and cuts with a depth of 13 mm are provided therein at predetermined intervals.

Figure 9:
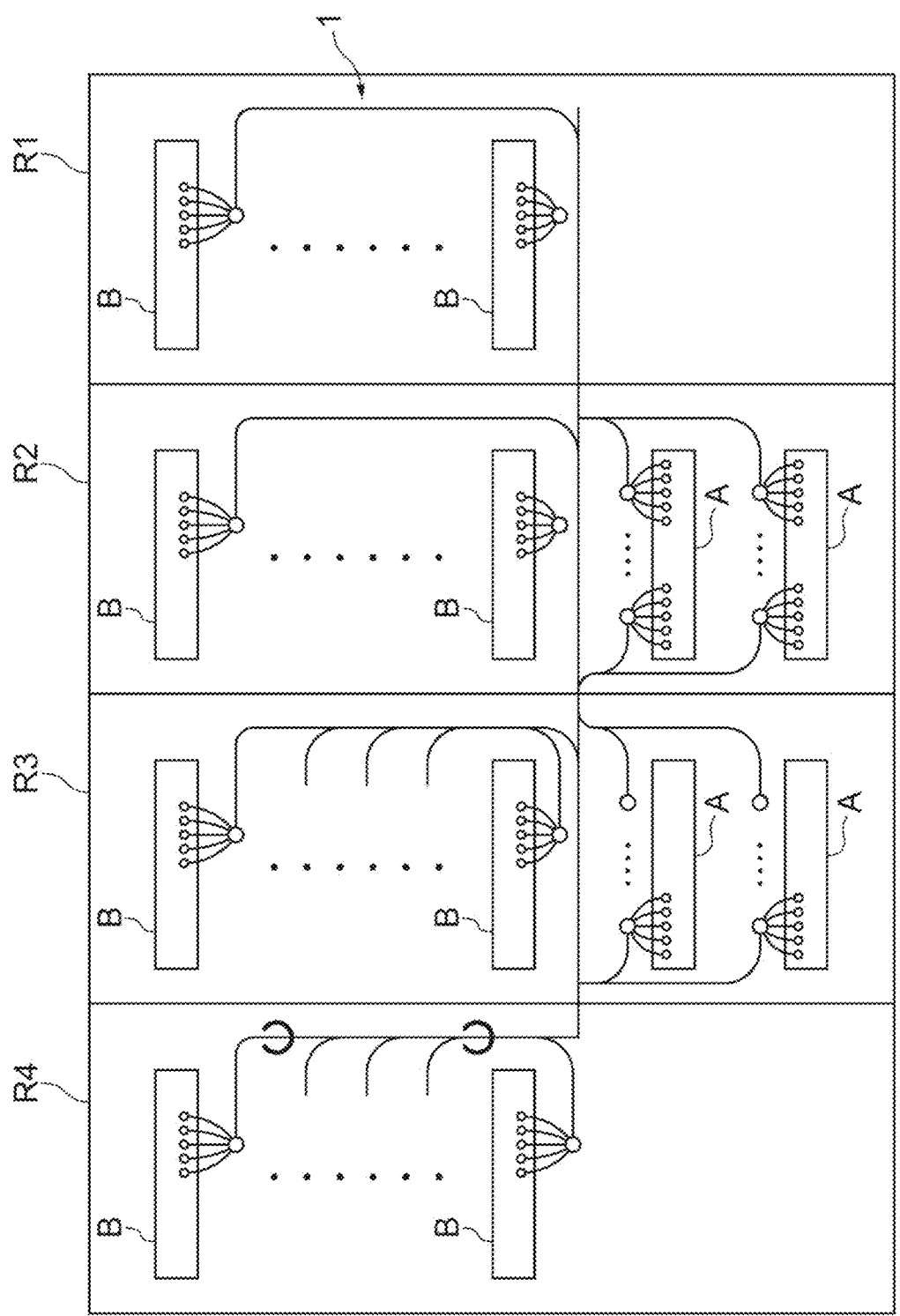
FIG. 9 is a diagram schematically illustrating a modified example of the optical wiring board according to the embodiment.
Figure 10:
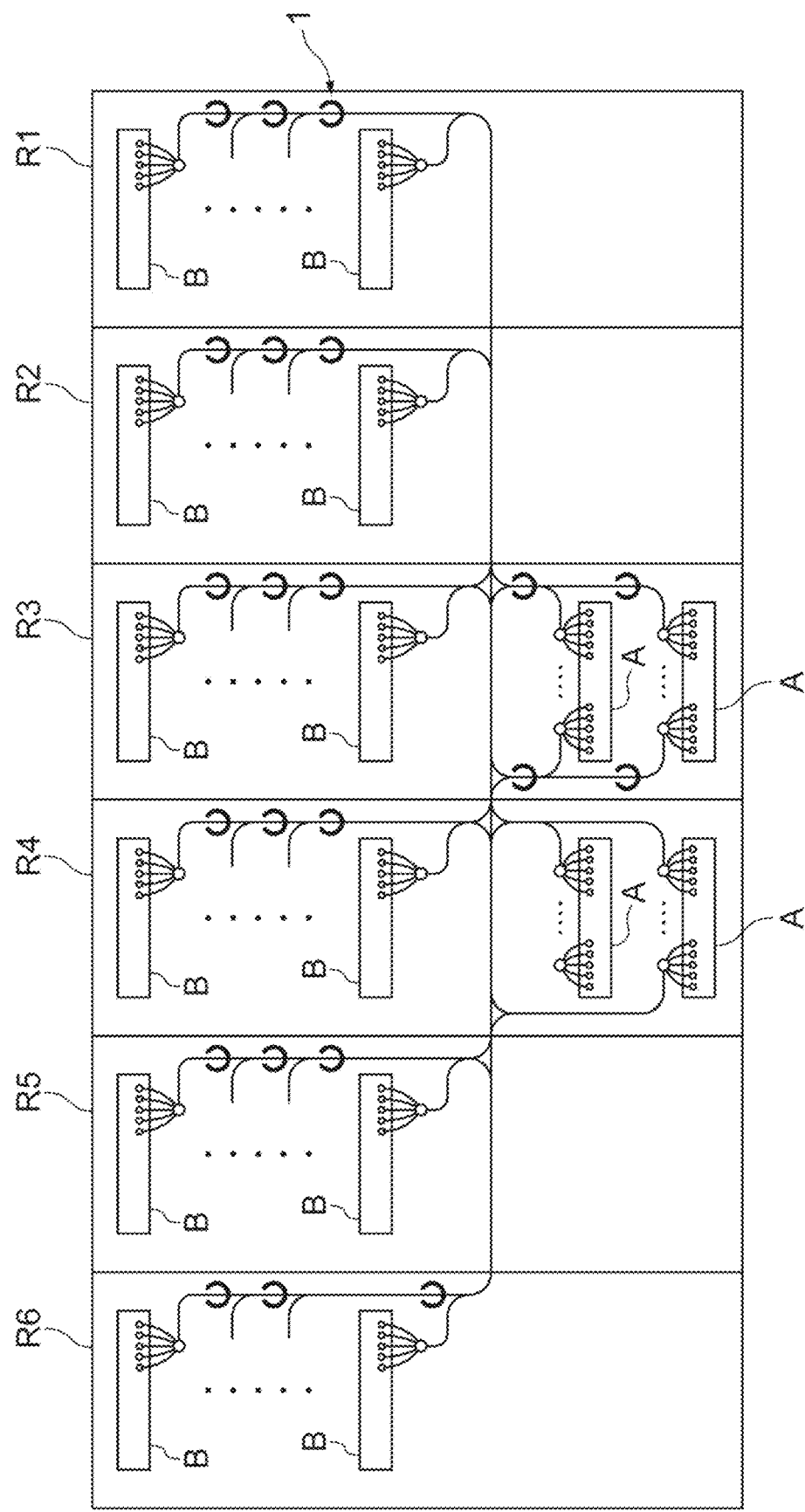
FIG. 10 is a diagram schematically illustrating another modified example of the optical wiring board according to the embodiment.

In the above embodiment, one optical/metallic composite harness 1 is applied to two racks R1 and R2, but the present disclosure is not limited thereto. One optical/metallic composite harness 1 may be applied to four racks R1 to R4 as illustrated in FIG. 9, or one optical/metallic composite harness 1 may be applied to six racks R1 to R6 as illustrated in FIG. 10. In this configuration, the number of straddle portions 7 is increased or the number of connecting cords 10 which are bundled by the first bundling member 20 or the second bundling member 22 is appropriately changed, and the configuration of the optical/metallic composite harness 1 is appropriately changed. In the above embodiment, an extra connecting cord is not provided, but an extra connecting cord may be additionally provided in the optical/metallic composite harness 1 and the extra connecting cord may be used in a workplace when a defect or the like occurs in any one connecting cord 10. By providing one or more extra connecting cords and using the extra connecting cord when a defect occurs in a part of the optical/metallic composite harness 1, it is possible to prevent costly labor-intensive work such as replacing the harness.

In the above embodiment, an embodiment of the present disclosure is applied to a connecting harness that connects the switching devices A such as optical switches/LAN switches to the servers B in an optical wiring board, but the embodiment of the present disclosure may be applied to wiring in a device such as a storage device or a network device. In the above harness, the connecting cords 10 in which optical fiber cords and metallic cords are mixed are used, but the above configuration may be applied to a harness using connecting cords including only at least one of the optical fiber cords and the metallic cords as the connecting cords.

What is claimed is:

1. A connecting harness for connecting M first device or devices (where M is an integer equal to or greater than 1) and N second devices (where N is an integer equal to or greater than 2) using connecting cords each including at least one of an optical fiber cord and a metal cord, the connecting harness comprising:
   a connecting cord group including the M×N connecting cords, in which first connectors capable of being connected to the first device or devices are provided at one end of each of the connecting cords and second connectors capable of being connected to the second devices are provided at the other end of each of the connecting cords;
   a first bundling member bundling the connecting cords of the connecting cord group beside the first device or devices in a predetermined number; and
   a second bundling member bundling the connecting cords of the connecting cord group beside the second devices in a predetermined number,
   wherein the connecting cord group is made into a harness in advance such that the connecting cords correspond to connection ports of the first device or devices and connection ports of the second devices using the first bundling member and the second bundling member, and
   wherein an extra-length portion by which the length of the connecting cords at the time of actual wiring is greater than a planned wiring distance between the first device or devices and the second devices is provided in advance in the connecting cord group.

2. The connecting harness according to claim 1, wherein the number of connecting cords which are bundled by each first bundling member is greater than the number of connecting cords which are bundled by each second bundling member.

3. The connecting harness according to claim 1, further comprising a third bundling member bundling the connecting cords in an intermediate area between the first bundling member and the second bundling member, wherein the number of connecting cords which are bundled by the third bundling member is greater than the numbers of connecting cords which are bundled by each first bundling member and each second bundling member.

4. The connecting harness according to claim 1, wherein the first bundling member and the second bundling member are net tubes or spiral tubes.

5. A connecting structure comprising:
   M first device or devices;
   N second devices; and
   the connecting harness according to claim 1 connecting the M first device or devices and the N second devices to each other.

6. The connecting harness according to claim 1, further comprising an aligning member aligning the connectors at the time of connection to the corresponding first device or devices or second devices at least one of the first connectors and the second connectors of the connecting cords.

7. The connecting harness according to claim 1, wherein one of the connecting cords includes the optical fiber cord, the optical fiber cord includes a plurality of optical fibers, a tensile-strength fiber surrounding the plurality of optical fibers, and a jacket surrounding the tensile-strength fiber wherein a sectional shape of the jacket is tubular.

8. The connecting structure according to claim 5, wherein each second device is a server.

9. The connecting harness according to claim 1, wherein at least one label is attached inward from both ends of each of the connecting cords and the at least one label indicates a connection port of the corresponding connecting cord.

10. The connecting harness according to claim 1, wherein two labels are attached inward from both ends of each of the connecting cords and the two labels are color-coded.

11. A connecting method connecting the M first device or devices and the N second devices using the connecting harness according to claim 1.

12. The connecting structure according to claim 5, further comprising a rack accommodating the connecting harness, the first device or devices, and the second devices therein.

13. The connecting structure according to claim 5, wherein each first device is a switching device switching an optical path in an optical network.

14. A connecting harness for connecting M first device or devices (where M is an integer equal to or greater than 1) and N second devices (where N is an integer equal to or greater than 2) using connecting cords each including at least one of an optical fiber cord and a metal cord, the connecting harness comprising:
  a connecting cord group including the M×N connecting cords, in which first connectors capable of being connected to the first device or devices are provided at one end of each of the connecting cords and second connectors capable of being connected to the second devices are provided at the other end of each of the connecting cords;
  a first bundling member bundling the connecting cords of the connecting cord group beside the first device or devices in a predetermined number; and
  a second bundling member bundling the connecting cords of the connecting cord group beside the second devices in a predetermined number,
  wherein the connecting cord group is made into a harness in advance such that the connecting cords correspond to connection ports of the first device or devices and connection ports of the second devices using the first bundling member and the second bundling member, and
  wherein the connecting harness is partitioned into two parts, a straddle portion connecting the two parts is provided, and the straddle portion includes at least one connecting cord.

15. A connecting structure comprising:
  M first device or devices;
  N second devices; and
  the connecting harness according to claim 14 connecting the M first device or devices and the N second devices to each other.

16. The connecting harness according to claim 14, wherein the number of connecting cords which are bundled by each first bundling member is greater than the number of connecting cords which are bundled by each second bundling member.

17. The connecting harness according to claim 14, further comprising a third bundling member bundling the connecting cords in an intermediate area between the first bundling member and the second bundling member, wherein the number of connecting cords which are bundled by the third bundling member is greater than the numbers of connecting cords which are bundled by each first bundling member and each second bundling member.

18. The connecting harness according to claim 14, wherein the first bundling member and the second bundling member are net tubes or spiral tubes.

19. The connecting harness according to claim 14, further comprising an aligning member aligning the connectors at the time of connection to the corresponding first device or devices or second devices at at least one of the first connectors and the second connectors of the connecting cords.

20. The connecting harness according to claim 14, wherein one of the connecting cords includes the optical fiber cord, the optical fiber cord includes a plurality of optical fibers, a tensile-strength fiber surrounding the plurality of optical fibers, and a jacket surrounding the tensile-strength fiber wherein a sectional shape of the jacket is tubular.

21. The connecting harness according to claim 14, wherein at least one label is attached inward from both ends of each of the connecting cords and the at least one label indicates a connection port of the corresponding connecting cord.

22. The connecting harness according to claim 14, wherein two labels are attached inward from both ends of each of the connecting cords and the two labels are color-coded.

23. A connecting method connecting the M first device or devices and the N second devices using the connecting harness according to claim 14.

* * * * *